Dec. 24, 1968   R. D. WATSON ET AL   3,418,028
BEARING STRUCTURE
Filed May 11, 1966
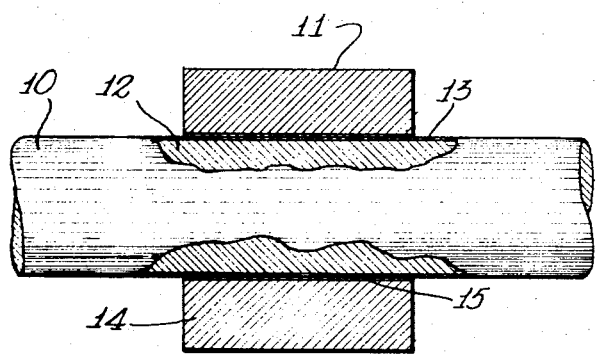
INVENTOR
Robert D. Watson
James N. C. Long
BY Robert V. Hacking
Weir, Marshall, MacRae &
PATENT AGENT

United States Patent Office 3,418,028
Patented Dec. 24, 1968

3,418,028
BEARING STRUCTURE
Robert D. Watson, James H. C. Long, and Robert V. Hacking, Deep River, Ontario, Canada, assignors to Atomic Energy of Canada Limited, Ottawa, Ontario, Canada, a corporation of Canada
Filed May 11, 1966, Ser. No. 549,226
1 Claim. (Cl. 308—241)

ABSTRACT OF THE DISCLOSURE

The invention comprises a bearing member and a journal rotatably mounted in the bearing member, both members being from a nickel alloy consisting essentially of Sn 3–5%, Bi 3–4.5%, Cr 11–14%, Fe 4–6%, Mo 2.5–3.5%, C up to 0.05%, Mn 0.65–1.0%, Si 0.15–0.50%, and remainder Ni, each member is provided with a tightly adherent oxide film formed by heating the member in air.

---

This invention relates to a bearing material and to bearing and journal structures embodying such material.

The performance and life of mechanical equipment, which operates continuously or intermittently immersed in water at high temperature, is limited because of excessive wear, galling and seizure of bearing materials.

In nuclear reactor mechanisms, additional limitations are imposed on the selection of bearing materials by the total absence of conventional lubrication, exposure to radiation, difficulty of replacing worn parts, and the requirement of safe and dependable operation. Moreover, it is desirable that products of corrosion or wear introduced into the systems by bearing materials should be kept to a minimum.

The two major requirements of a bearing material in underwater service are corrosion resistance and wear resistance.

Hydrodynamic bearings, such as in high temperature canned pumps, are usually of some form of graphite and are employed in combination with stainless steel shafts. However, graphite as a bearing is subject to excessive wear in the absence of hydrodynamic lubrication. Moreover, carbon compounds are friable, brittle, and too weak mechanically for use in many types of mechanisms.

Many synthetic materials, such as lubricant impregnated plastics, are available for use as dry or immersed bearings, but these are frequently subject to damage by radiation and few, in any case, are resistant to wear at high temperature.

Chromium or other types of plating on a corrosion resistant substrate such as stainless steel is a common form of protection for bearing components. Bearing surfaces are often treated by any of a number of different methods to increase resistance to wear. There are also several proprietary surface treatments used to provide resistance to galling and seizure. However, plated or treated surfaces are subject to wear and spalling with consequent exposure of the substrate and danger of the mechanism becoming inoperative.

It is an object of this invention to provide a bearing member having a substantially improved resistance to wear, galling, and seizure, particularly when employed in underwater service.

A further object is to provide a method for producing such a bearing member in a convenient and effective manner.

Another object is to provide a bearing and journal structure, wherein both the bearing and the journal in contact with such bearing are formed from the same material, such material having improved resistance to wear.

The invention will be described with reference to the accompanying drawing, the single figure of which shows an elevation, partly in section, of a bearing and journal structure in accordance with the invention.

In accordance with the invention, a bearing member is formed of a complex high nickel alloy sold under the trademark "Waukesha 88" by Waukesha Foundry Company, of Waukesha, Wis. The alloy has the following composition.

|  | Percent |
| --- | --- |
| Carbon, max. | 0.05 |
| Tin | 3–5 |
| Bismuth | 3–4.5 |
| Chromium | 11–14 |
| Iron | 4–6 |
| Molybdenum | 2.5–3.5 |
| Silicon | 0.15–0.50 |
| Manganese | 0.65–1.0 |
| Remainder nickel. | |

The nickel alloy hereinafter referred to in this specification and accompanying claims is that manufactured and sold under the trademark "Waukesha 88".

In accordance with the invention, a thick tightly-adherent oxide film is produced on the surface of the formed bearing member by subjecting it to heating in air. The heat treatment is conducted at a temperature of 750 to 850° C. for a period of 1 to 3 hours. A suitable oxidation treatment may be conducted at a temperature of 800° C. for two hours.

The oxide film, formed as described, is tightly adherent to the alloy body and withstands, to a greatly improved extent, wear conditions such as encountered in pressurized water at high temperatures. The oxide film described has a thickness of approximately 0.001 inch.

In accordance with a further feature of the invention, both the bearing itself and the journal in rubbing contact with the bearing are formed from the said nickel alloy and provided with the oxide film as described. It has been found that such a combination of bearing and journal members is highly effective in improving the wearing properties of structures produced from such a combination.

Referring to the drawing, which illustrates diagrammatically a structure in accordance with the invention, 10 is a journal disposed in a bearing 11. The journal is formed from a body 12 of the said nickel alloy having an oxidized film 13 on its contacting surface with bearing 11. The bearing is also formed from a body 14 of the said nickel alloy having an oxidized film 15 on its contacting surface with journal 10.

We claim:
1. A bearing and journal structure which comprises a bearing member and a journal rotatably mounted in said member, each of said bearing member and journal comprising a body of a nickel alloy consisting essentially of Sn 3–5%, Bi 3–4.5%, Cr 11–14%, Fe 4–6%, Mo 2.5–3.5%, C up to 0.05%, Mn 0.65–1.0%, Si 0.15–0.50%, and remainder Ni, said body having thereon a tightly adherent oxide film.

References Cited
UNITED STATES PATENTS

| 1,661,448 | 3/1928 | Taylor | 308—241 |
| 2,202,773 | 5/1940 | Given | 308—241 |
| 2,696,413 | 12/1954 | Wheildon | 308—241 X |
| 2,760,925 | 8/1956 | Bryant | 308—241 X |
| 2,934,480 | 4/1960 | Slomin | 308—241 X |
| 2,987,352 | 6/1961 | Watson | 308—241 |

EDGAR W. GEOGHEGAN, Primary Examiner.

L. L. JOHNSON, Assistant Examiner.